INVENTORS
WARREN H. BRACKBILL
LARIMER J. KNEPPER
& JOHN K. HALE
BY Joseph A. Brown
ATTORNEY

United States Patent Office 3,167,337
Patented Jan. 26, 1965

3,167,337
RETAINER
Warren H. Brackbill, Paradise, and Larimer J. Knepper and John K. Hale, New Holland, Pa., assignors to Sperry Rand Corporation, New Holland, Pa., a corporation of Delaware
Filed Feb. 26, 1963, Ser. No. 261,124
1 Claim. (Cl. 287—53)

This invention relates generally to drive structures and more particularly to an improved bearing adjustment retainer arrangement.

In certain drive installations a sheave, sprocket or other drive wheel is splined to a drive shaft to transmit power thereto. The shaft is rotatably supported by a bearing in a fixed sleeve or tube. The bearing is held in place by a nut and a given nut tightness is required to properly hold the bearing. The nut is carried on the rotatable shaft and once adjusted, it is necessary to lock the nut in place so that it will not move from adjusted position as a result of vibrations and other causes. Conventionally, locking the nut in place has been accomplished by drilling a hole through the drive shaft after the nut has been properly located and then using a cotter pin to hold the nut in place. The drilled hole weakens the shaft because of stress concentrations at the point of the hole. Further, while a cotter pin is inexpensive, the labor involved in drilling the shaft and installing the pin makes the retaining structure costly.

A main object of this invention is to provide a more economical means of locking a bearing retainer nut on a drive shaft.

Another object of this invention is to provide a bearing retainer arrangement whereby no drilling of the supporting shaft is required, with the resulting advantage that the shaft is not reduced in strength.

Another object of this invention is to provide a bearing adjustment retainer means which is infinitely variable.

A further object of this invention is to provide a locking structure of the character described wherein the lock is positive and slippage is wholly eliminated.

Other objects of this invention will be apparent hereinafter from the specification and from the recital in the appended claim.

Figure 1:
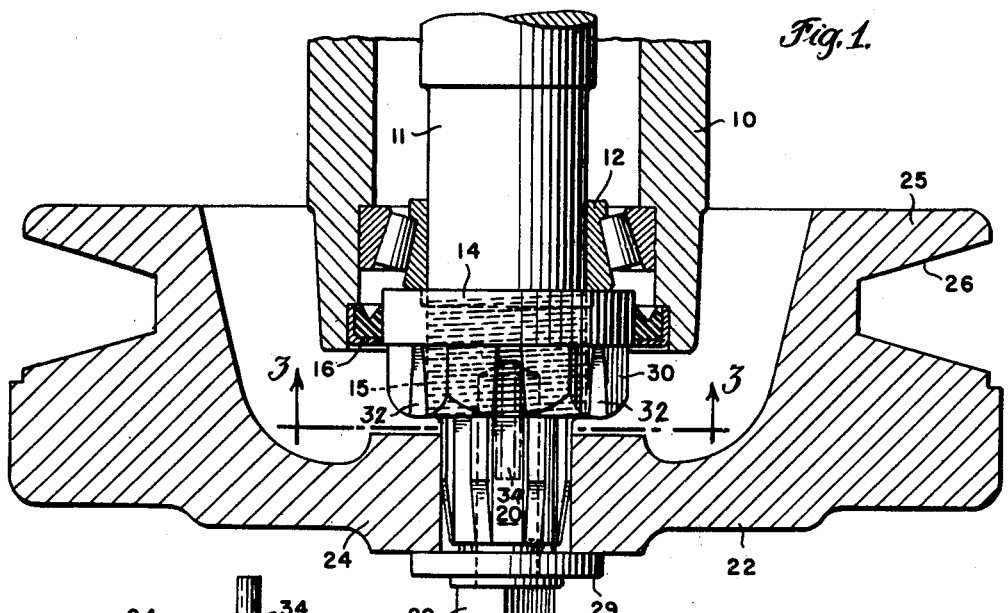
FIG. 1 is a horizontal medial section of a bearing adjustment retainer arrangement constructed according to this invention.
Figure 4:
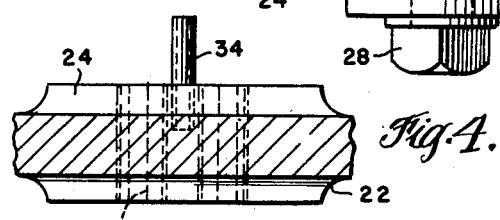
FIG. 4 is a sectional view of the hub portion of the drive wheel, the lock pin employed being illustrated.
Figure 2:
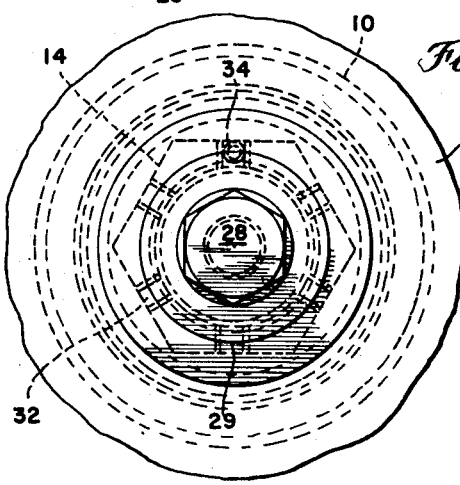
FIG. 2 is a fragmentary front view of FIG. 1.

Referring now to the drawing by numerals of reference, 10 denotes a support or sleeve through which a shaft 11 extends. The shaft is rotatably supported on support 10 by a tapered roller bearing 12 held in place by a nut 14 threaded onto portion 15 the shaft. A bearing seal is shown at 16 and into which nut 14 projects. The nut engages one axial end of the bearing 12 and accurate adjustment of the nut produces trouble free performance of the bearing.

Shaft 11 has an outwardly projecting splined end 20 having seven angularly spaced splines 21. Mounted on shaft end 20 is a drive wheel 22 having a hub portion 24 provided with internal splines 25 which mesh with the shaft splines. Drive wheel 22 has a sheave portion 25 grooved at 26 to receive a drive belt, not shown. When the drive wheel is rotated, such rotation is transmitted to shaft 11 which in turn rotates relative to support 10.

Drive wheel 22 is connected to shaft 11 by a cap screw 28 which threads into an axial hole in the end 20 of the shaft. The head of the cap screw engages a washer 29 which abuts against hub 24 of drive wheel 22. Thus, when the drive wheel is mounted on shaft 11, it is locked thereto against angular movement by the meshing splines 21 and 25 and it is held against axial movement away from support 10 by cap screw 28.

Figure 3:
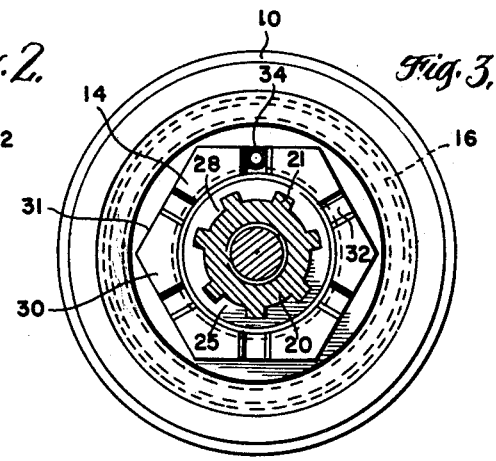
FIG. 3 is a vertical section taken on the line 3—3 of FIG. 1 looking in the direction of the arrows.

As shown best in FIG. 3, nut 14 has a hex head 30 which provides six peripheral sides 31. Each side 31 has an axially extending slot 32 opened outwardly and in the direction facing drive wheel 22. The drive wheel carries a lock pin 34 on hub 24 and spaced radially outwardly of the shaft projecting end 20. Pin 34 has an axis which is parallel to the shaft axis and it is press-fitted into hub portion 24 to extend toward bearing retainer nut 14. The length of lock pin 34 is sufficient to enable it to project into one of the slots 32 in nut 14. It will be apparent that when the pin 34 projects into one of the slots 32, nut 14 is positively locked against any rotation relative to shaft 11. Since pin 34 is fixedly carried on drive wheel 22 and the drive wheel is angularly locked to the shaft 11 by the meshing splines, the engagement of the pin with nut 14 produces a secure and positive retaining arrangement.

The possible locking positions of nut 14 is infinitely variable. Before the drive wheel 22 is mounted on shaft 11, it may be angularly adjusted to establish the particular meshing relationship of the splines 21 with the splines 25. In this way, seven possible angular positions are provided. The drive wheel 22 is positioned in the particular angular location which will align lock pin 34 with one of the slots 32 in nut 14. Since nut 14 provides six engagement locations and the spline connection provides seven, an infinitely variable number of locking positions result.

With the structure described, drilling of the shaft 11 is wholly eliminated thereby preventing a reduction in the strength of the shaft 11. The pin 34, press-fitted into drive wheel 22, provides a low cost locking arrangement subject to quick and ready assembly of the parts. Since nut 14 can be precisely located to exert a proper hold on the tapered roller bearing 12, the life of the bearing will be long, and trouble free performance will be obtained.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described our invention, what we claim is:

A drive structure comprising a fixed sleeve, a shaft inside said sleeve and rotatable relative thereto, said shaft having seven splines at an end projecting outwardly of said sleeve, a tapered roller bearing interposed between said shaft and sleeve, an adjustable hex nut threaded onto said shaft axially inwardly of the end thereof and retaining said bearing in position, a drive wheel mounted on said shaft and having splines meshing with the shaft splines, a lock pin carried on said drive wheel at the side thereof toward said nut, said pin being radially spaced from said shaft and having an axis parallel to the shaft axis, each of the six sides of said nut having an axial slot open toward said wheel and into which said pin is projectable to lock the nut in adjusted position, the particular slot engaged being determined by the rotatable position of the nut and the particular angular position of said drive wheel on said shaft, the seven splines and six nut sides providing a range of locking positions for said nut, and screw means holding said drive wheel on said shaft.

References Cited by the Examiner
UNITED STATES PATENTS

| | | | |
|---|---|---|---|
| 692,135 | 1/02 | Hansen | 287—53 X |
| 1,393,261 | 10/21 | Casey | 151—57 |
| 1,796,610 | 3/31 | Modler | 308—211 |
| 2,618,521 | 11/52 | Shields | 308—21 |
| 3,140,630 | 7/64 | Wolf | 151—57 X |

CARL W. TOMLIN, *Primary Examiner.*

ROBERT C. RIORDON, *Examiner.*